July 30, 1929.  G. W. ELSEY ET AL  1,722,327
ANTITHEFT DEVICE
Filed March 15, 1926
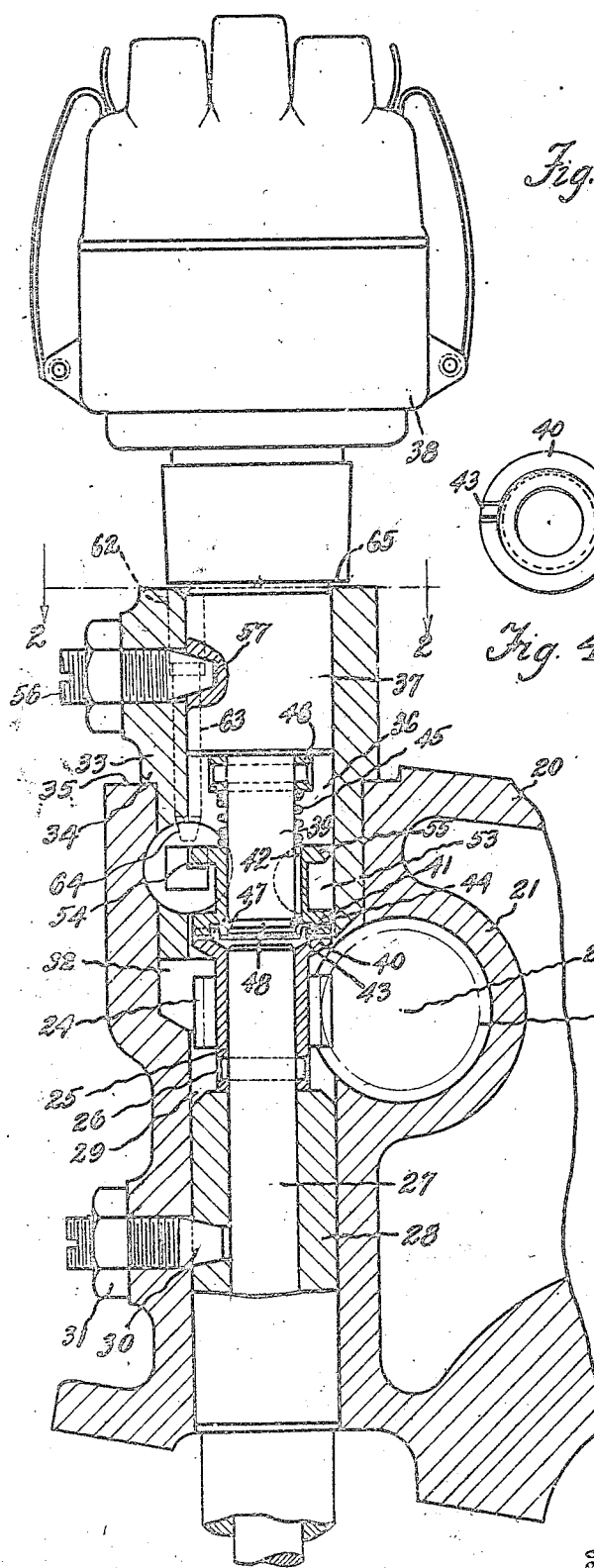
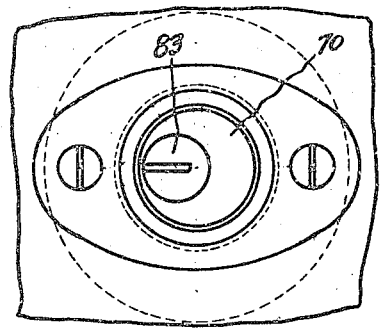
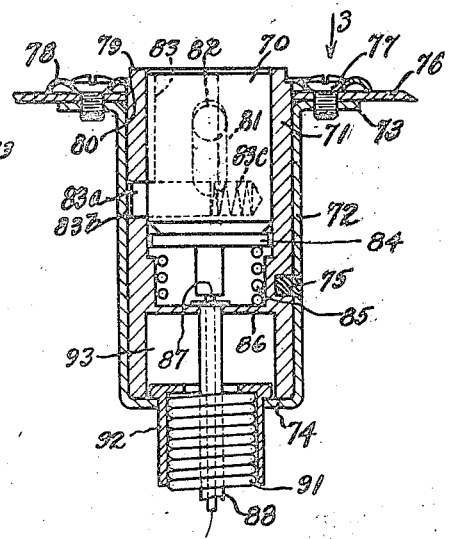
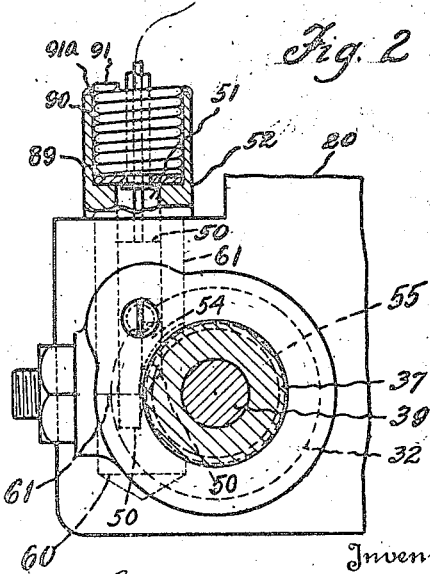
Inventor
George W. Elsey
and Frank H. Prescott
By their Attorneys Patented July 30, 1929.

1,722,327

UNITED STATES PATENT OFFICE.

GEORGE W. ELSEY AND FRANK H. PRESCOTT, OF ANDERSON, INDIANA, ASSIGNORS, BY MESNE ASSIGNMENTS, TO DELCO-REMY CORPORATION, OF DAYTON, OHIO, A CORPORATION OF DELAWARE.

ANTITHEFT DEVICE.

Application filed March 15, 1926. Serial No. 94,694.

This invention relates to a device for preventing theft of automotive vehicles. The objects of the invention are accomplished by providing a key controlled apparatus for locking the ignition timer in the engine frame and for locking in disengaged position a clutch which connects the ignition timer shaft with an engine driven shaft carried by the frame of the engine.

Further objects and advantages of the present invention will be apparent from the following description, reference being had to the accompanying drawings, wherein a preferred form of embodiment of the present invention is clearly shown.

In the drawings:

Fig. 1 is a side elevation partly in section showing an ignition timer supported by an engine frame and operated by an engine driven shaft and having applied thereto a form of the present invention.

Fig. 2 is a fragmentary plan view of a socket member provided by the engine frame, a sectional view of the ignition timer, the section being taken on the line 2—2 of Fig. 1, and a longitudinal sectional view of a lock controlled device for preventing removal of the timer.

Fig. 3 is a front view looking in the direction of the arrow 3 in Fig. 2 of a locking barrel and mounting plate therefor, forming a part of the key control apparatus.

Fig. 4 is a plan view of one of the clutch members which connects the timer shaft with the engine shaft.

In the drawings 20 designates the frame of an internal combustion engine which is provided with a plurality of aligned bearings, one of which is indicated at 21, for supporting a valve cam shaft 22. The cam shaft 22 is integrally provided with a spiral gear 23 which engages a spiral gear 24. Gear 24 is provided with a hub 25 which is secured by a pin 26 to a shaft 27. Shaft 27 is journalled in a bearing sleeve 28 which is received by tubular recess 29 in the crank case 20. The sleeve 28 is secured in position by a set screw 30 and a lock nut 31. The crank case is provided with a tubular recess 32 in alignment with the recess 29 but of larger diameter. Recess 32 receives a socket member 33 having a shoulder 34 which rests upon the surface 35 of the crank case. The socket member 33 is provided with a tubular bore 36 which receives the shank 37 of an ignition timer cup 38. The shank 37 provides a bearing for a shaft 39 which extends within the cup 38 to operate the ignition timer cam and the distributor rotor in a manner known to those skilled in the art. The shaft 39 is connected with the shaft 27 through companion clutch members 40 and 41, the former being formed integral with the gear hub 25 and the latter being slidably connected with the shaft 39 by a key 42. The clutch member 40 has an eccentric tooth 43 which engages an eccentric notch 44 provided by the clutch 41. Therefore the shafts 39 and 27 can be coupled in but one predetermined relation. The clutch member 41 is yieldingly urged toward the clutch 40 by a spring 45 located between the clutch 41 and a collar 46 secured to the shaft 39. A wire split ring 47 engages a groove 48 provided in the shaft 39, and thus prevents withdrawing the shaft 39 from the clutch 41 while the latter is locked in the engine frame.

The key controlled apparatus which can be manipulated to lock the clutch member 41 in a position disengaged from the clutch 40 and which will lock the timer cup 38 in the engine frame includes a locking bar 50 of square cross section and slidable through a suitable opening 51 in a housing member or plug 52 forming a part of the housing of the key controlled apparatus. The bar 50 is adapted to be received by a groove 53 provided by the clutch 41 and has a caming surface 54 adapted to engage a flange 55 provided by the clutch 41. When the bar 50 is in the unlocked position, it is clear of the groove 53 and the flange 55 so that the clutch members 40 and 41 are engaged as shown in Fig. 1, and so that the timer cup 38 may be removed from the socket member 33 after a set screw 56 has been withdrawn from a recess 57 in the shank 37 of the timer cup. When the bar 50 is moved into locking position shown in Fig. 2, it is received by the groove 53 of the clutch 41, and engages the flange 55 to separate the clutch member 41 from the clutch member 40. Thus the ignition timer is rendered inoperative and its removal from the engine frame is prevented.

The construction is such that the housing member 52 of the key controlled apparatus cannot be removed so long as the ignition timer is locked in the engine frame. This feature is present by providing the engine frame 20 and the socket member 33 with a transverse bore 60 which provides a socket for receiving a shank 61 of the housing member 52. As long as the shank 61 remains in position within the socket 60 the socket member 33 cannot be removed. The member 52 is secured in this position by a screw 62 having threaded engagement with the socket member 33 near its upper end and having a non-threaded shank 63 which extends through the engine frame 20 and has a conical end 64 engaging a conical recess in the side wall of the shank 61 of the member 52. The timer cup 38 includes a shoulder portion 65 which, when the timer is in the position shown in Fig. 1, will cover the exposed end of the screw 62. Therefore, as long as the timer is locked in position the screw 62 is inaccessible for removal and the housing member 52 of the key controlled apparatus cannot be removed from the engine frame. As will be more apparent hereafter the locking bar 50 cannot be removed from the engine frame except by use of the key controlled apparatus.

The key controlled apparatus includes in addition to the locking bar 50, a pin-tumbler lock shell 70 which is slidable in a tubular sleeve 71 contained within a tubular casing 72 having an outwardly turned flange 73 and an inwardly turned flange 74. The casing 72 and the sleeve 71 are secured by one or more screw pins 75. The flange 73 is secured to an instrument board or panel 76 by screws 77 which also secure a face plate 78 having a central opening adapted to receive the projecting end 79 of the sleeve 71. The face plate bears against the shoulder 80 of the sleeve 71. The shell 70 is provided with a guide slot 81 which receives a pin 82 carried by the sleeve 71 in order to prevent the shell 70 from turning but to allow it to slide within the sleeve 71. A key plug 83 rotates within the shell 70; and, on being turned by the proper key, will retract a cross-bolt 83$^a$ from a hole 83$^b$ in the sleeve 71. As the parts 70, 83 and 83$^a$ are parts of a standard make of pin-tumbler lock known to the trade as an automobile cylinder lock, it is deemed unnecessary to illustrate the mechanism for operating the bolt 83$^a$ by the key-plug 83. A spring 83$^c$ causes the bolt 83$^a$ to return to locking position within the hole 83$^b$.

A disc 84 is urged against the shell 70 by a spring 85 bearing at one end against a wall 86 provided internally of the sleeve 71. The disc 84 is attached to a Bowden wire 87 which extends through a Bowden wire tube 88 and is attached to the sliding bar 50. One end of the Bowden wire tube 88 is spinned against the wall 86 within the sleeve 71 and the other end is spinned against a disc 89 located within a recess 90 provided by housing member 52. When the bolt 83$^a$ is withdrawn from the hole 83$^b$ by turning the key plug 83, the spring 85 will move the shell 70 and the locking bar 50 upwardly, as viewed in Fig. 2, so that the bar 50 will be removed from the groove 53 and flange 55 of the clutch 41.

The Bowden wire tube 88 is encased by a flexible, hard metal conduit 91 having one end received by the recess 90 and attached to housing member 52 by staking or swedging at 91$^a$. The other end of the flexible conduit 91 is received by a sleeve 92 and attached in the same manner. Sleeve 92 is slidable through an aperture surrounded by the flange 74 of the sleeve 72 and slidable into a recess 93 provided by the sleeve 71. If the conduit 91 is moved sidewise in such a manner as to increase the length between its ends the sleeve 92 will merely slide further into the recess 93. The position of the Bowden wire will not be affected; hence, the locking bar 50 cannot be manipulated by disturbing the flexible housing member 91.

After the bar 50 is moved to unlocked position the engine may be cranked. The shaft 27 will be rotated and the clutch member 40 will automatically engage due to the action of spring 45, and then drive the member 41 when the tooth 43 of the former engages the notch 44 of the latter. Hence the timer will be automatically reconnected with the engine to produce correct ignition timing.

While the form of embodiment of the present invention as herein disclosed, constitutes a preferred form, it is to be understood that other forms might be adopted, all coming within the scope of the claims which follow.

What is claimed is as follows:

1. An anti-theft device for automotive vehicles comprising, in combination, an engine frame, an engine operated shaft supported by the frame, an ignition timer supported by the frame, a separable connection between the timer and the shaft and operated by said shaft, and a unitary key controlled means for preventing removal of the timer from the frame and for preventing operation of the timer by the engine shaft.

2. An anti-theft device for automotive vehicles comprising, in combination, an engine frame, an engine operated shaft supported by the frame, an ignition timer supported by the frame, a clutch for connecting the timer with the engine shaft, and key controlled means for disengaging the clutch and locking it to prevent removal of the timer from the frame.

3. An anti-theft devise for automotive vehicles comprising, in combination, an engine frame, an engine operated shaft carried thereby, an ignition timer attached to the frame and connected with the shaft, key controlled means for preventing removal of the timer from the frame, a casing for the key controlled means attached to the frame, and means for securing the casing to the frame and accessible for removal only when the timer is removed from the frame.

4. An anti-theft device for automotive vehicles comprising, in combination, an engine frame providing a socket, an engine operated shaft having a motion transmitting member exposed in the socket, an ignition timer having a shank received by the socket and a shaft carrying a motion transmitting member coupled with the first member when the shank is inserted within the socket, means for preventing removal of the timer from the socket including a movable bar, key operated means for moving the bar, an enclosure for the key operated means including a part attached to the engine frame, means for securing said part to the engine frame and accessible for removal only when the timer is removed from the frame.

5. An anti-theft device for automotive vehicles comprising in combination, an engine frame; an engine driven shaft supported by the frame; an ignition timer supported by the frame said timer including a shaft adapted to be operated by the engine driven shaft; a clutch comprising a member rigidly secured to the engine driven shaft and a member slidably but non-removably supported on the timer shaft; and a key controlled cam supported within the frame and adapted to be operated to engage the clutch member on the timer shaft to move it out of engagement with the other clutch member and to lock it in the frame for preventing removal of the timer from said frame.

6. An anti-theft device for automotive vehicles comprising in combination, an engine frame; an engine driven shaft supported by the frame; an ignition timer supported by the frame said timer including a shaft adapted to be operated by the engine driven shaft; a clutch comprising a member rigidly secured to the engine driven shaft and a spool-shaped member non-removably supported on the timer shaft so as to be slidable thereon; a spring normally holding said members in engagement; and a key controlled cam in said frame adapted to be moved into and out of the groove of the spool shaped member and into and out of engagement with the flange of said member more remote from the clutch member on the engine shaft, whereby the ignition unit is respectively disengaged from the engine driven shaft and securely locked against removal from the frame and again engaged with the said engine shaft and capable of removal from the frame.

7. An anti-theft device for automotive vehicles comprising, in combination, an engine frame, a rotatable engine driven clutch member housed by the frame, a socket member provided by the frame, a timer housing having a shank extending within the socket, a timer shaft supported by the housing and extending within the engine frame, a clutch member carried by the timer shaft, and engageable with the engine driven clutch member, a locking bar movable transversely to the timer shaft through the engine frame, means cooperating with the bar for causing the clutch members to be separated, means cooperating with the bar for preventing removal of the timer housing from the frame, a member extending longitudinally of the timer shaft for preventing removal of the bar from the frame, and means provided by the timer housing for preventing removal of said member while the housing is mounted upon the frame.

In testimony whereof we hereto affix our signatures.

GEORGE W. ELSEY.
F. H. PRESCOTT.